UNITED STATES PATENT OFFICE.

MEINHARD HOFFMANN, OF MAINKUR, GERMANY.

BLACKISH-BLUE AZO DYE.

SPECIFICATION forming part of Letters Patent No. 560,796, dated May 26, 1896.

Application filed November 15, 1895. Serial No. 569,102. (Specimens.) Patented in England August 14, 1893, No. 15,444, and in France August 21, 1893, No. 232,299.

*To all whom it may concern:*

Be it known that I, MEINHARD HOFFMANN, a citizen of Prussia, and a resident of Mainkur, near Frankfort-on-the-Main, Germany, have invented new and useful Improvements in the Production of Azo Dyes, of which the following is a specification.

This invention, for which patents have been obtained in France, No. 232,299, dated August 21, 1893, and in Great Britain, No. 15,444, dated August 14, 1893, relates to an improvement concerning the process of producing azo dyes, which is described in my specification forming part of the United States Letters Patent No. 533,463, dated February 5, 1895. The coloring-matters described in this patent are derived from $alpha_1$, $alpha_2$, amido-acetnaphthalid $beta_3$ or $beta_4$ sulfo-acid and are obtained by combining the diazo compounds of the said acids with a diazotizable amin, then immediately diazotizing again, combining with a phenol, an amin, or an amidophenol and finally saponifying. They have a great technical value in consequence of their special property to dye both animal and vegetable fibers with nearly equal affinity and shade and are therefore suitable for dyeing, for instance, fabrics composed of wool and cotton. In Letters Patent No. 533,463 I have described, as an example, the combination in which in the place of $R_1$ the gamma-amidonaphtholsulfo-acid is used. This combination yields bluish-black shades. However, for many purposes a still more bluish shade is wanted, and in order to obtain products of this kind I have replaced the gamma-amidonaphtholsulfo-acid by naphtholsulfo-acid or dioxynaphthalenesulfo-acids.

The new products correspond to the general formula

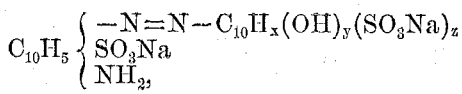

in which $y$ and $z$ stand for the number of the hydroxyle or sulfo groups. For instance, 1 or 2 and X represent the number of the non-substituted hydrogen atoms of the naphthalene nucleus.

In carrying out my invention I proceed, for instance, as follows: The diazo compound of 28.2 kilos $alpha_1$, $alpha_2$, amido-acetnaphthalid $beta_3$, sulfo-acid is combined with 14.4 kilos of alpha-naphthylamin. The product is dissolved in five hundred liters of water and four kilos of caustic soda. Then seven kilos nitrite are added to the solution, which is then allowed to run into thirty-six kilos diluted muriatic acid, which is kept cold. The diazo compound separates in brown very difficultly soluble flakes. If the diazo compound is brought into an alkaline solution of twenty-five kilos of $alpha_1$, $alpha_2$, naphtholsulfo-acid the formation of the dyestuff takes place at once, which is precipitated and filtered off. It is boiled with one thousand liters of ten per cent. soda-lye until the acetyl group is split off. By neutralizing the liquid the dyestuff precipitates. It dyes wool and cotton a blackish blue. As it contains a free amido group it may be diazotized on the fiber like all the dyestuffs corresponding to the above-stated constitution. Analogous products are obtained if in this example the alphanaphtholsulfo-acid is replaced by another mono or di sulfo-acid of alpha or beta naphthol or of a dioxynaphthalene the alpha-naphthylamin may be replaced, for instance, by $alpha_1$, $beta_1$, amidonaphtholether, paraxylidin, amidoparacresol-ether or $alpha_1$, $beta_3$ naphthylamin-sulfo-acid.

Having thus described my invention and in what manner it may be performed, what I claim as new, and desire to secure by Letters Patent, is—

1. The process of producing new azo dyestuffs by combining the diazo compound of $alpha_1$ $alpha_2$ amidoacetnaphthalid-beta-sulfo-acid with a diazotizable amin, diazotizing again, combining with a hydroxylated naphthalenesulfo-acid and saponifying the products obtained substantially as described.

2. The new blackish-blue dyestuff which is a black powder, readily soluble in water with a dark-blue color, insoluble in alcohol, dissolving in concentrated sulfuric acid with a bluish-black shade, the latter solution forming a blue precipitate by an excess of water and dyeing vegetable and animal fibers substantially as described.

In testimony that I claim the foregoing as my invention I have signed my name, in the presence of two witnesses, this 2d day of November, 1895.

MEINHARD HOFFMANN.

Witnesses:
ALVESTO P. HOGUE,
JEAN GRUND.